US010068182B2

United States Patent
Nakamura et al.

(10) Patent No.: US 10,068,182 B2
(45) Date of Patent: Sep. 4, 2018

(54) QUANTUM COMPUTER AND QUANTUM COMPUTING METHOD

(71) Applicant: Kabushiki Kaisha Toshiba, Minato-ku (JP)

(72) Inventors: Satoshi Nakamura, Tokyo (JP); Kouichi Ichimura, Yokohama (JP); Hayato Goto, Kawasaki (JP); Mamiko Kujiraoka, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 238 days.

(21) Appl. No.: 15/211,112

(22) Filed: Jul. 15, 2016

(65) Prior Publication Data

US 2016/0321558 A1    Nov. 3, 2016

Related U.S. Application Data

(63) Continuation of application No. PCT/JP2014/081415, filed on Nov. 27, 2014.

(30) Foreign Application Priority Data

Jan. 16, 2014    (JP) ................. 2014-006049

(51) Int. Cl.
*G02F 3/00*    (2006.01)
*G06N 99/00*    (2010.01)
(Continued)

(52) U.S. Cl.
CPC ......... *G06N 99/002* (2013.01); *G02F 1/0126* (2013.01); *G02F 3/00* (2013.01);
(Continued)

(58) Field of Classification Search
CPC ....... G06N 99/002; G02F 1/0126; G02F 3/00; G02F 2203/05; G02F 2203/15; H01S 3/00
(Continued)

(56) References Cited

U.S. PATENT DOCUMENTS 6,800,837 B1    10/2004  Ichimura et al.
6,988,058 B1 *   1/2006  Sherwin ................ B82Y 10/00
                                                          250/207
(Continued)

FOREIGN PATENT DOCUMENTS

JP    2001-209083 A    8/2001
JP    2006-65219       3/2006
(Continued)

OTHER PUBLICATIONS

Kouichi Ichimura., "A simple frequency-domain quantum computer with ions in a crystal coupled to a cavity mode," Optics Communications, Sep. 1, 2001, pp. 119-125.
(Continued)

*Primary Examiner* — William R Alexander
(74) *Attorney, Agent, or Firm* — Oblon, McClelland, Maier & Neustadt, L.L.P.

(57) ABSTRACT

According to an embodiment, a quantum computer includes physical systems $X_i$, a physical system $Y_j$ and a light source unit. The physical systems $X_i$ and the physical system $Y_j$ are provided in a cavity. Each physical system $X_i$ includes states $|0\rangle_i$, $|1\rangle_i$, $|2\rangle_i$, and $|e\rangle_i$, the states $|0\rangle_i$ and $|1\rangle_i$ being used for a qubit, a $|2\rangle_i$-$|e\rangle_i$ transition being resonant with a cavity mode of the cavity. The physical system $Y_j$ includes states $|2\rangle'_j$ and $|e\rangle'_j$, a $|2\rangle'_j$-$|e\rangle'_j$ transition being resonant with the cavity mode. The light source unit applies laser beams to the cavity to manipulate states of two of physical systems $X_i$, the
(Continued)

laser beams including a laser beam for collecting population in the state $|2\rangle'_j$ in the $|2\rangle'_j$-$|e\rangle'_j$ transition.

8 Claims, 5 Drawing Sheets

(51) Int. Cl.
  *H01S 3/00* (2006.01)
  *G02F 1/01* (2006.01)
(52) U.S. Cl.
  CPC ............ *H01S 3/00* (2013.01); *G02F 2203/05* (2013.01); *G02F 2203/15* (2013.01)
(58) Field of Classification Search
  USPC ........................................................ 359/107
  See application file for complete search history.

(56) References Cited

U.S. PATENT DOCUMENTS

| | | | |
|---|---|---|---|
| 7,466,725 B2 | 12/2008 | Ichimura et al. | |
| 7,560,726 B2 | 7/2009 | Beausoleil et al. | |
| 8,106,717 B2 | 1/2012 | Ichimura et al. | |
| 9,858,531 B1* | 1/2018 | Monroe | G06N 99/002 |
| 2004/0200952 A1 | 10/2004 | Beausoleil, Jr. et al. | |
| 2005/0059167 A1* | 3/2005 | Vitaliano | B82Y 10/00 |
| | | | 436/518 |
| 2006/0169877 A1* | 8/2006 | Goto | B82Y 10/00 |
| | | | 250/225 |
| 2008/0031296 A1* | 2/2008 | Spillane | B82Y 10/00 |
| | | | 372/45.01 |
| 2008/0063339 A1* | 3/2008 | Spillane | B82Y 10/00 |
| | | | 385/14 |
| 2008/0310000 A1 | 12/2008 | Beausoleil, Jr. et al. | |
| 2012/0069414 A1* | 3/2012 | Nakamura | B82Y 10/00 |
| | | | 359/107 |
| 2013/0107253 A1* | 5/2013 | Santori | G06N 99/002 |
| | | | 356/301 |
| 2014/0314419 A1* | 10/2014 | Paik | H04B 10/70 |
| | | | 398/115 |
| 2017/0059964 A1* | 3/2017 | Nakamura | G02F 3/00 |

FOREIGN PATENT DOCUMENTS

| | | |
|---|---|---|
| JP | 2007-535679 A | 12/2007 |
| JP | 2008-507739 A | 3/2008 |
| JP | 2010-72233 | 4/2010 |

OTHER PUBLICATIONS

International Search Report dated Feb. 10, 2015 in PCT/JP2014/081415, filed Nov. 27, 2014 (with English Translation.
Written Opinion dated Feb. 10, 2015 in PCT/JP2014/081415, filed Nov. 27, 2014.
S. Nakamura et al. "Analysis for Quantum Gate in Frequency-Domain Quantum Computation Using Rare-Earth-Ion-Doped Crystal", Abstracts of the Meeting of the Physical Society of Japan, vol. 68, No. 1, Separate vol. 2, Mar. 5, 2013, 2 pages.
S. Nakamura et al. "Analysis of Frequency-Domain Quantum Computation in Multi-Qubit System", Abstracts of the Meeting of the Physical Society of Japan, vol. 68, No. 2, Separate vol. 2, Aug. 26, 2013, 2 pages.
Hayato Goto et al. "Multiqubit Controlled Unitary Gate by Adiabatic Passage with an Optical Cavity", Physical Review A, vol. 70, 2004, 8 pages.

* cited by examiner

QUANTUM COMPUTER AND QUANTUM COMPUTING METHOD

CROSS REFERENCE TO RELATED APPLICATIONS

This application is a Continuation Application of PCT Application No. PCT/JP2014/081415, filed Nov. 27, 2014 and based upon and claiming the benefit of priority from Japanese Patent Application No. 2014-006049, filed Jan. 16, 2014, the entire contents of all of which are incorporated herein by reference.

FIELD

Embodiments described herein relate to a quantum computer utilizing the coupling between a cavity and a physical system.

BACKGROUND

In recent years, researches are being made of a quantum computer which performs a computation by using quantum-mechanical superposition. As one of quantum computers, a quantum computer based on frequency domain quantum computation that discriminates between qubits (quantum bits) in frequency domains is known in the art. In the frequency domain quantum computation, qubits are not discriminated in terms of their positions. Therefore, even qubits that are not to be manipulated are under the effect of operation light with detuning, causing undesired interaction. The undesired interaction may cause gate errors. The adverse effects caused by the undesired interaction may decrease if the frequency difference of the transitions used for qubits is very large. Where the transition distributed in a finite frequency domain is used, however, transitions of small frequency differences may have to be used to load a large number of qubits. Even where the transitions of small frequency differences are used, a quantum computer required is a computer based on the frequency domain quantum computation capable of performing a quantum gate while suppressing the effects caused by the undesired interaction.

DETAILED DESCRIPTION

According to one embodiment, a quantum computer includes physical systems $X_i$ (i=1, 2, ..., N; N being an integer not less than 2), a physical system $Y_j$ (j=1, 2, ..., $N_2$; $N_2$ being an integer not less than 1), and a light source unit. The physical systems $X_i$ are provided in a cavity, each of the physical systems $X_i$ comprising at least four states including states $|0>_i$, $|1>_i$, $|2>_i$ and $|e>_i$, energy of the state $|e>_i$ being higher than energy of the states $|0>_i$ and $|1>_i$ used for a qubit and energy of the state $|2>_i$ used for assisting a gate operation, a $|2>-|e>_i$ transition being resonant with a cavity mode of the cavity. The physical system $Y_j$ is provided in the cavity, the physical system $Y_j$ being different from the physical systems $X_i$, the physical system $Y_j$ comprising at least two energy states including states $|2>'_j$ and $|e>'_j$, energy of the state $|e>'_j$ being higher than energy of the state $|2>'_j$, a $|2>'_j-|e>'_j$ transition being resonant with the cavity mode. The light source unit applies laser beams to the cavity to manipulate a state of a physical system $X_s$ (where s is a natural number not more than N) and a state of physical system $X_t$ (where t is a natural number not more than N and different from s) of the physical systems $X_i$, the laser beams including a first laser beam resonating with a $|1>_s-|e>_s$ transition, a second laser beam resonating with a $|1>_t-|e>_t$ transition, and a third laser beam for collecting, population in the state $|2>'_j$ in the $|2>'_j-|e>'_j$ transition of the physical system $Y_j$.

Hereinafter, various embodiments will be described with reference to the drawings. In the following embodiments, the like elements will be denoted by the like reference symbols, and redundant descriptions will be omitted where appropriate.

First of all, a description will be given of frequency domain quantum computation and "undesired interaction" which may occur at the quantum gate thereof. A description will also be given of the "resonance condition" under which the effects of the undesired interaction are particularly marked. Further, a description will be given of a quantum gate operation method and configuration, which control the resonance condition so as to eliminate the effects of the undesired interaction.

[Frequency Domain Quantum Computation]

In the frequency domain quantum computation, a plurality of physical systems, which are arranged in an optical cavity (also called an optical resonator) and each of which has a transition resonating with a common cavity mode (eigenmode) and has other transitions different in frequency depending upon the physical systems, are used as qubits. For example, ions and atoms can be used as the physical systems. In the frequency domain quantum computation, each physical system can be selectively manipulated by radiating a laser beam resonating with the transition frequency of the physical system.

A description will be given of the case where N four-level systems $X_i$ (i=1, 2, 3, ..., N) are used as physical systems. It is noted here that N is an integer which is not less than 2. Each of the four-level systems $X_i$ has four energy states. The four energy state will be expressed as $|0>_i$, $|1>_i$, $|2>_i$, and $|e>_i$ in the energy level ascending order. The suffix i attached to each state (each ket vector) is for identifying the four-level systems $X_i$. In the following, the suffix i may be omitted. The states $|0>_i$ and $|1>_i$ are used for a qubit, and the state $|2>_i$ is used for assisting the gate operation. The excited state $|e>_i$ has a higher level of energy than the states $|0>_i$, $|1>_i$ and $|2>_i$. The $|2>_i-|e>_i$ transition (namely, a transition between the state $|2>_i$ and the state $|e>_i$) is a transition resonating with a common cavity mode of the cavity. The frequency of the $|1>_i-|e>_i$ transition differs depending upon the four-level systems $X_i$.

Figure 1:
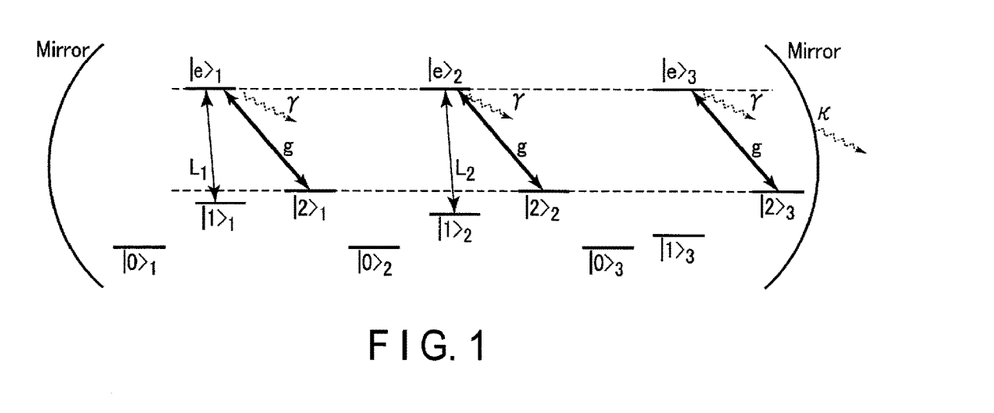
FIG. 1 illustrates frequency domain quantum computation.

FIG. 1 illustrates a physical system that is used for the frequency domain quantum computation when N=3. As shown in FIG. 1, physical systems $X_1$, $X_2$ and $X_3$ are coupled to a common cavity mode. To be specific, the $|2>_1$-$|e>_1$ transition, the $|2>_2$-$|e>_2$ transition and the $|2>_3$-$|e>_3$ transition resonate with the common cavity mode. That is, the frequency of the $|2>_1$-$|e>_1$ transition, the frequency of the $|2>_2$-$|e>_2$ transition and the frequency of the $|2>_3$-$|e>_3$ transition are equal to the resonance frequency of the common cavity mode. The frequency of the $|1>_1$-$|e>_1$ transition, the frequency of the $|1>_2$-$|e>_2$ transition and the frequency of the $|1>_3$-$|e>_3$ transition differ from each other.

Where two of these four-level systems $X_i$ are manipulated (for example, the states of four-level systems $X_1$ and $X_2$ are manipulated), operation light $L_1$ resonating with the $|1>_1$-$|e>_1$ transition and operation light $L_2$ resonating with the $|1>_2$-$|e>_2$ transition are radiated to all four-level systems $X_i$. Ideally, the states of four-level systems $X_1$ and $X_2$ can be selectively manipulated by the radiation of operation light L1 and operation light L2. As a method for manipulating the states used in a quantum gate, an adiabatic passage via a cavity is known in the art. In this method, when, for example, the state of the four-level system $X_1$ is manipulated from the initial state $|1>_1$ to the state $|2>_1$ and the state of the four-level system $X_2$ is manipulated from the initial state $|2>_2$ to the state $|1>_2$, the intensities of the operation light $L_1$ and $L_2$ are controlled in such a manner that the Rabi frequencies $\Omega_1$ and $\Omega_2$ of the operation light $L_1$ and $L_2$ satisfy Expression (1) below under the condition where $\tau_1 > \tau_2$.

$$\Omega_1(t) = \Omega_0 \exp\left[-\frac{(t-\tau_1)^2}{2\sigma^2}\right] \quad (1)$$

$$\Omega_2(t) = \Omega_0 \exp\left[-\frac{(t-\tau_2)^2}{2\sigma^2}\right]$$

[Undesired Interactions]

Figure 2:
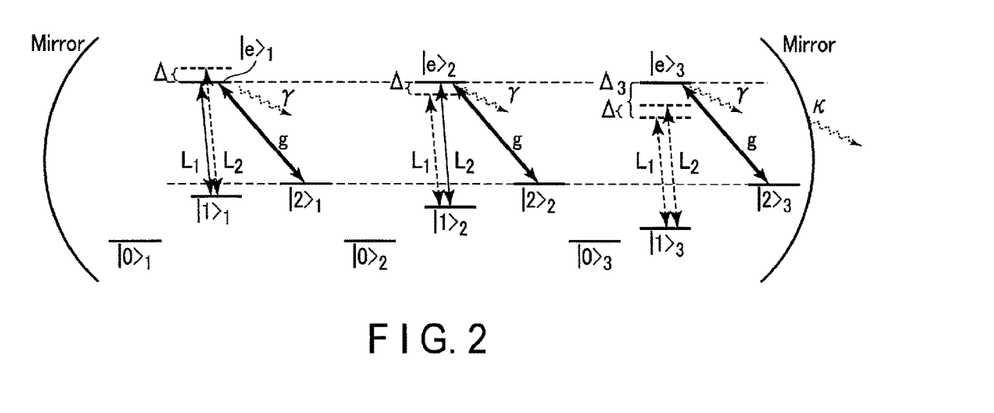
FIG. 2 illustrates undesired interaction in the physical systems used for the frequency domain quantum computation.

Strictly speaking, undesired interactions described below inevitably occur in the frequency domain quantum computation. Since the four-level systems $X_i$ are not discriminated from one another in light of their positions, operation light with detuning is applied to four-level systems $X_i$ which are not to be manipulated, leading to the undesired interactions. To be specific, the undesired interactions include interactions caused by operation light $L_1$ in four-level systems $X_2$ and $X_j$ (j=3, 4, ..., N) and interactions caused by operation light $L_2$ in four-level systems $X_1$ and $X_j$ (j=3, 4, ..., N). FIG. 2 illustrates a physical system including undesired interactions when N=3. In FIG. 2, the solid-line two-headed arrow connecting the state $|1>_i$ and the state $|e>_i$ indicates a necessary interaction, and a broken-line two-headed arrow indicates an undesired interaction. The thick solid-line two-headed arrow connecting the state $|2>_i$ and the state $|e>_i$ indicates a cavity mode.

If the frequency difference between the $|1>_i$-$|e>_i$ transitions of the four-level systems $X_i$ is very large, the undesired interaction does not cause a significant effect. However, since the frequencies of the transitions are distributed in a finite frequency domain, transitions of a small frequency difference should be utilized to use a large number of qubits. For this reason, it is desirable that the quantum gate can be performed with high efficiency even if the frequency differences are small.

[Resonance Condition]

A description will be given of the property of an undesired interaction. The Hamiltonian describing a physical system used for the frequency domain quantum computation including an undesired interaction (such as the physical system depicted in FIG. 2) is expressed by Expression (2) set forth below.

$$H(t)/\hbar = \sum_{i=1}^{N}\left[\sum_{j=0,1,2,e}\omega_j^{(i)}\sigma_{jj}^{(i)} - i\gamma\sigma_{ee}^{(i)}\right] + [2\pi f_g a^\dagger a - i\kappa a^\dagger a] + \sum_{i=1}^{N}[ga\sigma_{e2}^{(i)} + \Omega_1(t)e^{-i2\pi f_1 t}\sigma_{e1}^{(i)} + \Omega_2(t)e^{-i2\pi f_2 t}\sigma_{e1}^{(i)} + H.c.] \quad (2)$$

where $\sigma_{ab}^{(i)}$ is an operator for transition of state $|b>_i$ of four-level system $X_i$ to state $|a>_i$, a and $a^\dagger$ are the annihilation operator and the creation operator of the cavity mode, respectively, g is a coupling constant for coupling between the cavity mode and a physical system, $\gamma$ is a relaxation rate of transition, $\kappa$ is an attenuation constant of the cavity, and H.c. is a Hermitian conjugate.

The terms of the Hamiltonian will be described. The first term includes an energy term of each state of each ion and an energy relaxation term of each ion. The second term includes an energy term and a cavity relaxation term of the cavity mode. In the following, a description will be given of the case where $\gamma=\kappa=0$ on the assumption of an ideal strongly-coupled system. The third term is an interaction term, including an interaction between the cavity mode and the $|2>_i$-$|e>_i$ transition of each four-level system $X_i$, an interaction between the operation light $L_1$ and the $|1>_i$-$|e>_i$ transition of each four-level system $X_i$, and an interaction between the operation light $L_2$ and the $|1>_i$-$|e>_i$ transition of each four-level system $X_i$.

The interaction Hamiltonian in the Hamiltonian given by Expression (2) is expressed as Expression (4) below, in which $H_0$ given by Expression (3) below is used.

$$H_0/\hbar \equiv \sum_{i=1}^{N}\left[\sum_{j=0,1,2,e}(\omega_j^{(i)}\sigma_{jj}^{(i)})\right] + 2\pi f_g a^\dagger a \quad (3)$$

$$H'(t)/\hbar = \exp[-iH_0 t/\hbar](H/\hbar)\exp[iH_0 t/\hbar]$$

$$= \sum_{i=1}^{N} ga\sigma_{e2}^{(i)} + \Omega_1(t)\left\{\sigma_{e1}^{(1)} + e^{-i\Delta t}\sigma_{e1}^{(2)} + \sum_{j=3}^{N}e^{-i\Delta_j t}\sigma_{e1}^{(j)}\right\} + \Omega_2(t)\left\{e^{i\Delta t}\sigma_{e1}^{(1)} + \sigma_{e1}^{(2)} + \sum_{j=3}^{N}e^{-i(\Delta+\Delta_j)t}\sigma_{e1}^{(j)}\right\} + H.c.$$

In Expression (4), the following relations are used.

$(\omega_e^{(1)} - \omega_1^{(1)}) - 2\pi f_1 = 0$, $(\omega_e^{(1)} - \omega_1^{(1)}) - 2\pi f_2 = \Delta$, $(\omega_e^{(2)} - \omega_1^{(2)}) - 2\pi f_1 = -\Delta$, $(\omega_e^{(2)} - \omega_1^{(2)}) - 2\pi f_2 = 0$, $(\omega_e^{(j)} - \omega_1^{(j)}) - 2\pi f_1 = \Delta_j$, $(\omega_e^{(j)} - \omega_1^{(j)}) - 2\pi f_2 = \Delta + \Delta_j$, $(\omega_e^{(i)} - \omega_2^{(i)}) - 2\pi f_g = 0$, for i=1,2, ... N and j=3,4, ..., N.

$\Delta$ is a frequency difference between the $|e>_1$-$|1>_1$ transition and the $|e>_2$-$|1>_2$ transition, and $\Delta_j$ is a frequency difference between the $|e>_1$-$|1>_1$ transition and the $|e>_j$-$|1>_j$ transition.

The interaction Hamiltonian given by Expression (4) is divided into a necessary interaction $H_1$ and an undesired interaction V.

$$H'(t) = \begin{cases} H_1(t)+V(t) \begin{cases} H_1(t)/\hbar = \sum_{i=1}^{N} g a \sigma_{e2}^{(i)} + \Omega_1(t)\sigma_{e1}^{(1)} + \Omega_2(t)\sigma_{e1}^{(2)} + H.c. \\ V(t)/\hbar = \Omega_1(t)\left\{ e^{-i\Delta t}\sigma_{e1}^{(2)} + \sum_{j=3}^{N} e^{-i\Delta_j t}\sigma_{e1}^{(j)} \right\} + \\ \Omega_2(t)\left\{ e^{i\Delta t}\sigma_{e1}^{(1)} + \sum_{j=3}^{N} e^{-i(\Delta+\Delta_j)t}\sigma_{e1}^{(j)} \right\} + H.c. \end{cases} \end{cases} \quad (5)$$

In the adiabatic passage via the cavity, the error probability caused by the undesired interactions can be calculated by perturbation theory, using Expression (5). An initial state $|\psi^{(0)}\rangle$ is assumed to be a dark state $|\psi_0^{(0)}\rangle$ that is one of eigenstates of $H_1$. The error probability in the adiabatic passage is the probability of transition to another eigenstate $|\psi_n^{(t)}\rangle$ $^{(n\neq 0)}$ at time t. In order to perform this manipulation with high efficiency, it is general to use operation light $L_1$ and operation light $L_2$ that satisfy $\Omega_{1,2} \ll g$. Since V is smaller than $H_1$ in this case, the time evolution can be calculated by performing perturbation theory with respect to V, as shown in Expression (6) set forth below.

$$|\psi(t)\rangle = |\psi_0(t)\rangle + \sum_n C_n^{(1)} |\psi_n(t)\rangle + \sum_n C_n^{(2)} |\psi_n(t)\rangle + O(V^3) \quad (6)$$

$$\begin{cases} C_n^{(1)}(t) = \frac{1}{i\hbar} \int_0^t dt' e^{-(E_n-E_0)t'/i\hbar} \langle \psi_n(t')|V(t')|\psi_0(t')\rangle \\ C_n^{(2)}(t) = \left(\frac{1}{i\hbar}\right)^2 \int_0^t dt' \int_0^{t'} dt'' e^{-(E_n-E_k)t'/i\hbar} e^{-(E_k-E_0)t''/i\hbar} \\ \quad \langle \psi_n(t')|V(t')|\psi_k(t')\rangle\langle \psi_k(t'')|V(t'')|\psi_0(t'')\rangle \end{cases}$$

In Expression (6), $E_n$ is an eigenvalue corresponding to the eigenstate $|\psi_n\rangle$ of $H_1$. $E_n$ changes with time in accordance with $\Omega_{1,2}$ alone. In the case where $\Omega_{1,2} \ll g$, changes in $E_n$ are sufficiently small, compared with the absolute value of $E_n$. Therefore, when the exponents of the exponent functions in coefficients $C_n^{(1)}$ and $C_n^{(2)}$ are zero, the error probability increases to such an extent that the perturbation theory becomes invalid. In view of the fact that V(t') contains an oscillation term, the resonance condition given by Expression (7) below can be obtained from the first-order coefficient $C_n^{(1)}$ as a condition under which the error probability of the adiabatic passage via the cavity increases.

$$(E_n-E_0)/\hbar = \pm\Delta, \pm\Delta_j, \pm(\Delta+\Delta_j) \quad (7)$$

Likewise, the resonance condition given by Expression (8) can be obtained from the second-order coefficient.

$$\begin{cases} (E_k - E_0)/\hbar = \pm\Delta, \pm\Delta_j, \pm(\Delta+\Delta_j) \\ (E_n - E_k)/\hbar = \pm\Delta, \pm\Delta_j, \pm(\Delta+\Delta_j) \end{cases} \quad (8)$$

Compared with the resonance condition obtained from the first-order coefficient $C_n^{(1)}$, the resonance condition obtained from the second-order coefficient $C_n^{(2)}$ does not contribute much. However, when the two or more conditions are satisfied simultaneously, the contribution is significantly large. As a condition for permitting two or more conditions to be satisfied in the resonance condition of Expression (8), the following condition given by Expression (9) is obtained.

$$(E_n-E_0)/\hbar = \pm\Delta, \pm\Delta_j, \pm 2\Delta, \pm 2\Delta_j, \pm(\Delta-\Delta_j), \pm(2\Delta+\Delta_j), \pm(\Delta+2\Delta_j), \pm 2(\Delta+\Delta_j) \quad (9)$$

for j=3, 4, . . . , N.

The analytical solution to the resonance condition can be obtained by calculating the eigenvalue $E_n$ of $H_1$. Where the term of $\Omega_{1,2}$ of $H_1$ is set at zero for the case where $\Omega_{1,2} \ll g$, the eigenvalue $E_n$ can be obtained based on the analogy of well-known vacuum Rabi splitting. The number of four-level systems $X_i$ having a population in state $|2\rangle_i$ or state $|e\rangle_i$ will be denoted by $N_2$, the number of four-level systems $X_i$ having a population in state $|e\rangle_i$ will be denoted by $n_e$, and the number of photons in the cavity mode will be denoted by $n_c$. The eigenvalues of $H_1$ can be classified by designating the total number $N_e$ of excitons ($N_e = n_e + n_c$) and a maximal value $n_e|_{max}$ of $n_e$. Part of the eigenvalues of $H_1$ are given by Expression (10) below.

$$E_{1,N_2}/\hbar = \pm\sqrt{N_2}g \quad (N_e=1, n_e|_{max}=N_2)$$

$$E_{2,N_2}/\hbar = 0, \pm\sqrt{4N_2-2}g \quad (N_e=2, n_e|_{max}=N_2)$$

$$E_{1,N_2-1}/\hbar = \pm\sqrt{N_2-2}g \quad (N_e=2, n_e|_{max}=N_2-1) \quad (10)$$

By using Expressions (7), (9) and (10), the resonance condition under which undesired interactions increase can be analytically obtained. The resonance condition should be avoided in order to perform the adiabatic passage via the cavity with high efficiency, namely, to perform the quantum gate efficiently in the frequency domain quantum computation.

[Control of Resonance Condition]

As shown in Expression (10), the eigenvalues of $H_1$ vary in accordance with the number $N_2$ of four-level systems $X_i$ having a population in either state $|2\rangle_i$ or state $|e\rangle_i$.

This means that the resonance condition can be controlled based on the number of four-level systems $X_i$ having a probability amplitude in the transition coupled to the cavity. This kind of control is referred to as a control based on the addition of the transition coupled to the cavity.

For example, in a quantum computer utilizing three qubits, the adiabatic passage via the cavity is performed such that four-level systems $X_1$, $X_2$ and $X_3$ are manipulated from the initial states $|1\rangle_1$, $|2\rangle_2$ and $|1\rangle_3$ to states $|2\rangle_1$, $|1\rangle_2$ and $|1\rangle_3$. In the manipulation, where $N_e$ is equal to 1, $N_2$ is equal to 2, and where $N_e$ is equal to 2, $N_2$ is equal to 3. Therefore, the eigenvalues of $H_1$ can be obtained based on Expression (10), in the way expressed in Expression (11). The resonance condition can be obtained from Expressions (7) and (9), using the eigenvalues represented by Expression (11).

$$E_{1,2} = \pm\sqrt{2}g$$

$$E_{2,3} = 0, \pm\sqrt{10}g$$

$$E_{2,2} = \pm g \quad (11)$$

Where three physical systems having a transition probability in the transition coupled to the cavity are added, the eigenvalues of $H_1$ can be obtained in the way indicated by Expression (12) below.

$$E_{1,2} = \pm\sqrt{5}g$$

$$E_{2,3} = 0, \pm\sqrt{22}g$$

$$E_{2,2} = \pm 2g \quad (12)$$

In this case, the region in which the resonance condition can be avoided significantly increases in the region where $|\Delta|<g$ and $|A_j|<g$. Therefore, if a frequency distribution of the four-level systems $X_i$ is stochastically provided, the probability that the quantum gate can be performed with high efficiency increases. In addition, more qubits can be used.

As described above, the undesired interactions can be suppressed by controlling the resonance condition by adding a transition coupled to the cavity, and as a result, frequency domain quantum computation can be performed with high efficiency. Please note that what is described herein is nothing but an example. With respect to the frequency distribution of physical systems actually provided, the number of additional transitions coupled to the cavity can be changed in such a manner that control to a more appropriate condition is enabled.

Hereinafter, embodiments will be described with reference to FIGS. 3 to 9.

First Embodiment

Figure 3:
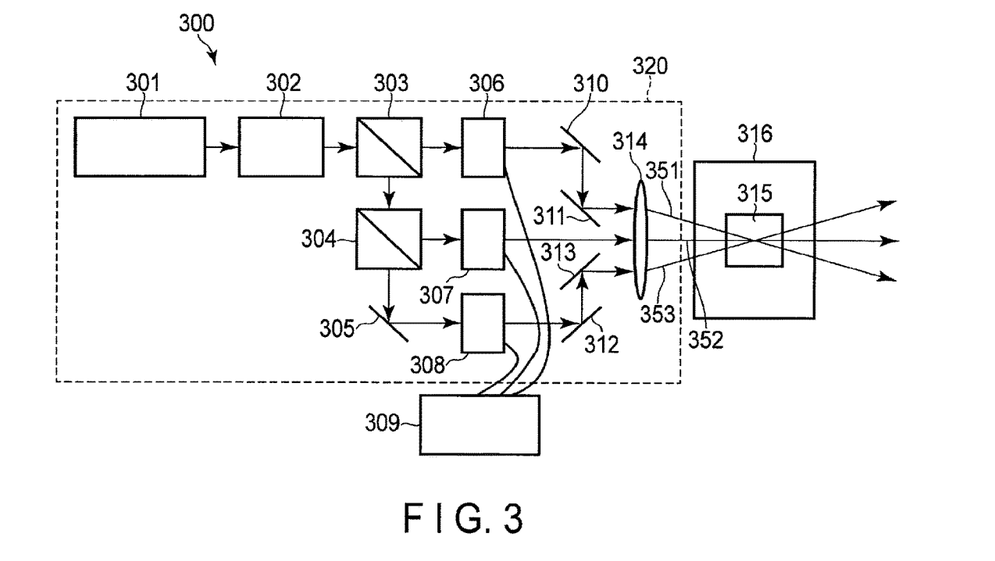
FIG. 3 illustrates a quantum computer according to an embodiment.

FIG. 3 schematically illustrates a quantum computer 300 according to the first embodiment. According to the first embodiment, $Pr^{3+}$ ions doped in $Y_2SiO_5$ crystal are used as specific physical systems that can be regarded as four-level system $X_i$. As shown in FIG. 3, the quantum computer 300 includes a sample 315, which serves as a cavity wherein dielectric multi-layer mirrors are arranged on sides of the $Pr^{3+}$-ion doped $Y_2SiO_5$ crystal (Pr:YSO). The sample 315 is arranged inside a cryostat 316 and kept at a low temperature (e.g., at 4K).

Figure 4:
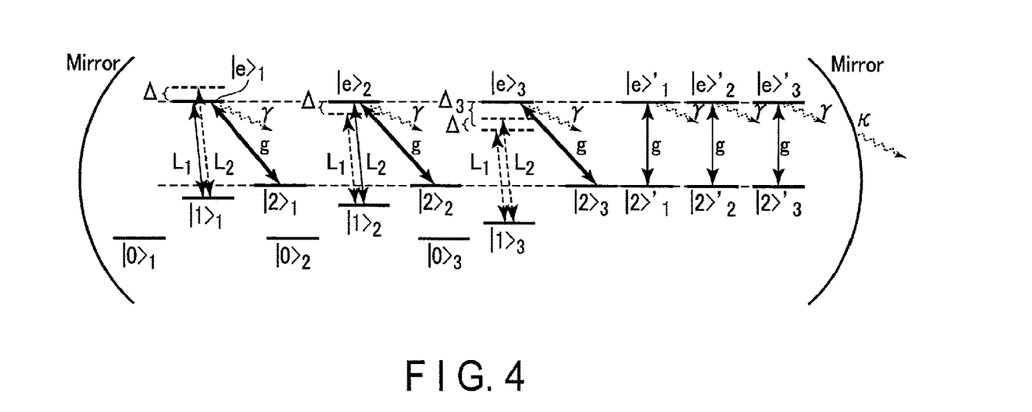
FIG. 4 illustrates a physical system which is used for the frequency domain quantum computation in the embodiment.

Let us consider the case where, as shown in FIG. 4, six $Pr^{3+}$ ions are used in the frequency domain quantum computation and three of these $Pr^{3+}$ ions are used as qubits. The three $Pr^{3+}$ ions used as qubits will be expressed as $X_1$, $X_2$ and $X_3$, and the remaining three $Rr^{3+}$ ions will be expressed as $Y_1$, $Y_2$ and $Y_3$. The ions $Y_1$, $Y_2$ and $Y_3$ are used for controlling the resonance condition.

To be specific, each of the ions $X_1$, $X_2$ and $X_3$ has states $|0>$, $|1>$, $|2>$ and $|e>$ in the ascending order of energy level. The states $|0>_i$ and $|1>_i$ are used for the qubit, and the state $|2>_i$ is used for assisting the gate operation. The $|2>-|e>$ transitions of the ions $X_1$, $X_2$ and $X_3$ resonate with the common cavity mode of the cavity. Each of the ions $Y_1$, $Y_2$ and $Y_3$ has states $|0>'$, $|1>'$, $|2>'$ and $|e>'$ in the ascending order of energy level. In FIG. 4, illustration of the states $|0>'$ and $|1>'$of each of the ions $Y_1$, $Y_2$ and $Y_3$ is omitted. The $|2>'-|e>'$ transitions of the ions $Y_1$, $Y_2$ and $Y_3$ resonate with the common cavity mode of the cavity. The prime "'" is attached to the states of the ions $Y_1$, $Y_2$ and $Y_3$. The addition of the prime is intended to mean that the physical systems used for controlling the resonance conditions and the physical systems used as qubits may be different in kind. The ions $Y_1$, $Y_2$ and $Y_3$ may be the same as the ions $X_1$, $X_2$ and $X_3$ ($Pr^{3+}$ ions in this example). Alternatively, they may be different from the ions $X_1$, $X_2$ and $X_3$ in kind, or may be a combination of different kinds of ions. Where the ions $Y_1$, $Y_2$ and $Y_3$ are different in kind from the ions $X_1$, $X_2$ and $X_3$, the ions $Y_1$, $Y_2$ and $Y_3$ do not have to have state $|0>'$ or $|1>'$.

Figure 5:
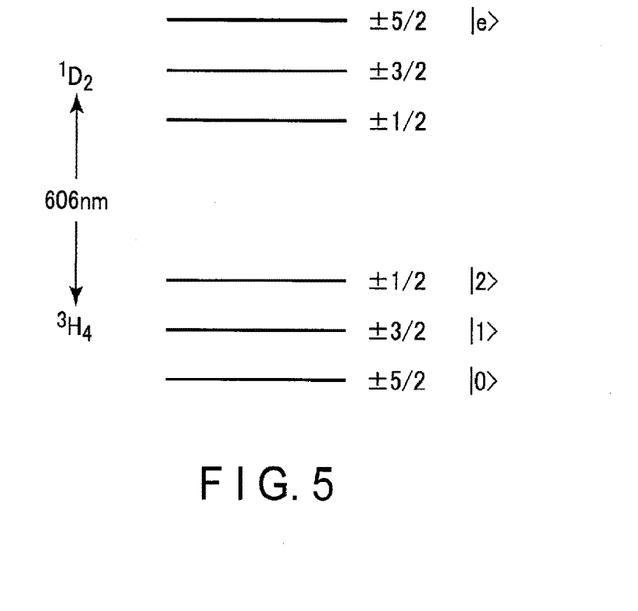
FIG. 5 illustrates part of the energy states of the $Pr^{3+}$ ion in the $Y_2SiO_5$ used in the embodiment.

FIG. 5 illustrates part of the energy states of the $Pr^{3+}$ ion in the $Y_2SiO_5$ crystal. In FIG. 5, three ($|\pm1/2>$, $|=3/2>$ and $|\pm5/2>$) of the hyperfine structure states of a ground state $^3H_4$ are shown, and three ($|\pm1/2>$, $|=3/2>$ and $|\pm5/2>$) of the hyperfine structure states of an excited state $^1D_2$ are shown. The wavelength corresponding to the transition frequency between the excited state $^1D_2$ and the ground state $^3H_4$ is approximately 606 nm. The hyperfine structure states $|\pm5/2>$, $|\pm3/2>$ and $|7E1/2>$ of the ground state $^3H_4$ correspond to the states $|0>$, $|1>$ and $|2>$ shown in FIG. 4, and the hyperfine structure state $|5/2>$ of the excited state $^1D_2$ corresponds to the state $|e>$ shown in FIG. 4. In this case, the $|0>-|e>$ transition, the $|1>-|e>$ transition and the $|2>-|e>$ transition are optically allowed, and the $|0>-|1>$ transition, the $|0>-|2>$ transition and the $|1>-|2>$ transition are optically forbidden.

In the quantum computer 300 shown in FIG. 3, the ring dye laser 302 excited by the argon ion laser 301 is used as a light source. A laser beam emitted from the ring dye laser 302 is split into three laser beams by means of two beam splitters 303 and 304, and these three laser beams are guided to acousto-optic modulators 306, 307 and 308, respectively. To be specific, the beam splitter 303 splits the laser beam emitted from the ring dye laser 302 into two laser beams, and one of them enters the acousto-optic modulator 306 and the other is directed to the beam splitter 304. The beam splitter 304 splits the incident laser beam into two laser beams, and one of them enters the acousto-optic modulator 307 and the other is reflected by a mirror and then enters the acousto-optic modulator 308.

The acousto-optic modulators 306, 307 and 308 modulate the incident laser beams in accordance with a signal generated by a controller 309, thereby generating modulated laser beams 351, 352 and 353, respectively. The modulated laser beam 351 is guided to the sample 315 by mirrors 310 and 311 and lens 314. The modulated laser beam 352 is guided to the sample 315 by the lens 314. The modulated laser beam 353 is guided to the sample 315 by mirrors 312 and 313 and the lens 314. In the present embodiment, the argon ion laser 301, the ring dye laser 302, the beam splitters 303 and 304, the mirror 305, the acousto-optic modulators 306 to 308, the mirrors 310 to 313 and the lens 314 jointly form the light source unit 320.

Figure 6:
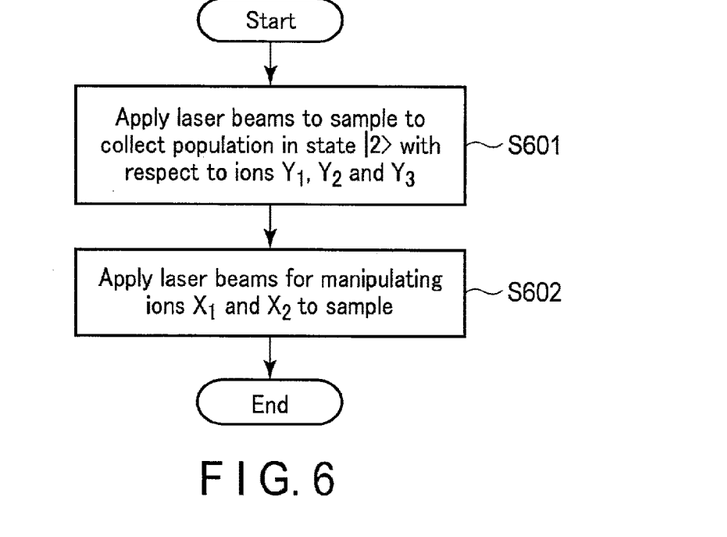
FIG. 6 is a flowchart illustrating a method for manipulating two physical systems according to the embodiment.
Figure 7:
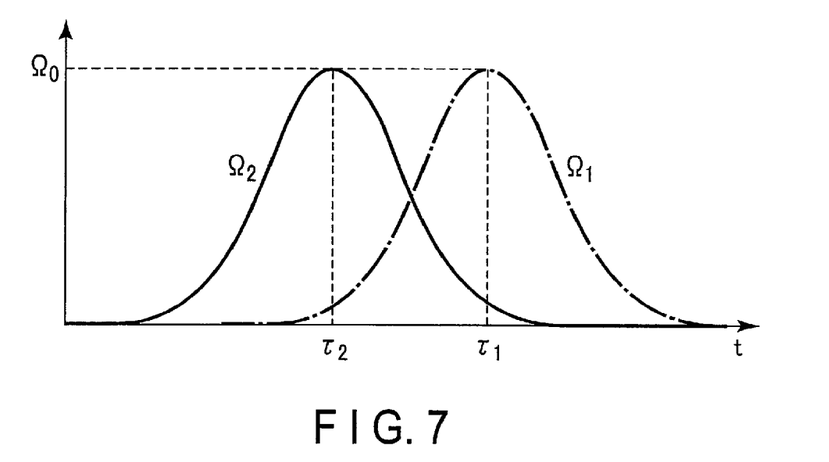
FIG. 7 is a waveform chart illustrating pulses used for the adiabatic passage via a cavity according to the embodiment.

A method for manipulating the ions $X_1$ and $X_2$, which are qubits included in the three qubits, will be specifically described, referring to FIGS. 3, 6 and 7. First, the light source unit 320 applies the modulated laser beam 353 to the sample 315, so that a population is collected in state $|2>$ of transition $|2>-|e>$, with respect to the ions $Y_1$, $Y_2$ and $Y_3$ (step S601 in FIG. 6). To be specific, the acousto-optic modulator 308 modulates the incident laser beam such that the modulated laser beam 353 resonates with the $|0>-|e>$ transition or the $|1>-|e>$ transition.

Subsequently, in the state where the modulated laser beam 353 is kept applied, the light source unit 320 simultaneously applies the modulated laser beams 351 and 352, which are for manipulating the ions $X_1$ and $X_2$, to the sample 315 (step S602 in FIG. 6). The "simultaneous application" is intended to mean that the application time of the modulated laser beam 351 and the application time of the modulated laser beam 352 overlap each other at least in part. To be specific, the acousto-optic modulator 306 modulates the incident laser beam such that the Rabi frequency $\Omega_1$ of the modulated laser beam 351 changes in the way shown in Expression (1), and the acousto-optic modulator 307 modulates the incident laser beam such that the Rabi frequency $\Omega_2$ of the modulated laser beam 352 changes in the way shown in Expression (1). When the states of the ions $X_1$ and $X_2$ are changed from the initial states $|1>_1$ and $|2>_2$ to the states $|2>_1$ and $|1>_2$, $\tau_1$ and $\tau_2$ are made to satisfy $\tau_1 > \tau_2$. FIG. 7 illustrates temporal changes in the Rabi frequencies $\Omega_1$ and $\Omega_2$ when the ions $X_1$ and $X_2$ is manipulated from the initial states $|1>_1$ and $|2>_2$ to the states $|2>_1$ and $|1>_2$. In FIG. 7, the transverse axis represents time, while the vertical axis represents Rabi frequencies. The waveform indicated by the dashed-dotted line is Rabi frequency $\Omega_1$, and the waveform indicated by the solid line is Rabi frequency $\Omega_2$. As an example, the parameters of the Rabi frequencies $\Omega_1$ and $\Omega_2$ of the laser beams 351 and 352 are set as follows: $\Omega_0=1$ kHz, $\tau_1=64.1$ ms, $\tau_2=55.9$ ms and $\sigma \rightarrow 20$ ms.

The modulated laser beams 351, 352 and 353 are applied to the sample 315 in this manner, and this enables the ions the $X_1$ and $X_2$ to be changed from the initial states $|1\rangle_1$ and $|2\rangle_2$ to the state $|2\rangle_1$ and $|1\rangle_2$, and yet the state of the ions $X_3$ (e.g., $|1\rangle_3$) is kept unchanged while avoiding the resonance condition.

As described above, the quantum computer according to the first embodiment uses a physical system which is different from physical systems used as qubits and which include a transition coupling with the common cavity mode. By using such physical systems, the quantum gate can be performed very efficiently, while suppressing the undesired interactions.

Second Embodiment

In the first embodiment, one light source is used for generating laser beams used for state manipulations. In the second embodiment, a light source is prepared for each of laser beams used for state manipulations.

Figure 8:
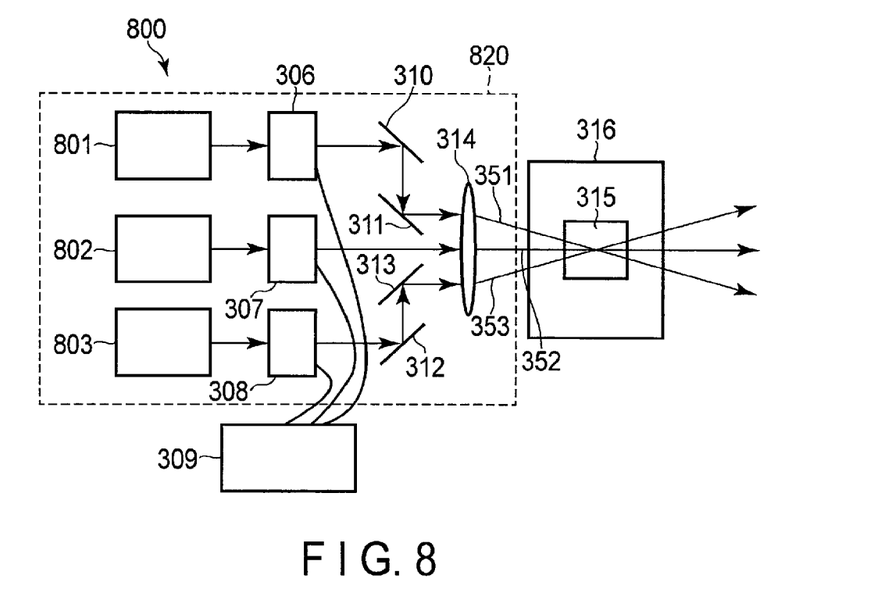
FIG. 8 illustrates a quantum computer according to another embodiment.

FIG. 8 schematically illustrates a quantum computer 800 according to the second embodiment. As shown in FIG. 8, the quantum computer 800 includes semiconductor lasers 801, 802 and 803. Laser beams emitted from the semiconductor lasers 801, 802 and 803 are guided to acousto-optic modulators 306, 307 and 308, respectively. Since the operation of the acousto-optic modulators 306, 307 and 308 is similar to that described in the first embodiment, the explanation thereof is omitted. In the present embodiment, the semiconductor lasers 801 to 803, the acousto-optic modulators 306-308, the mirrors 310-313 and the lens 314 jointly form a light source unit 820.

Like the first embodiment, the second embodiment enables efficient performance of a quantum gate.

Third Embodiment

Figure 9:
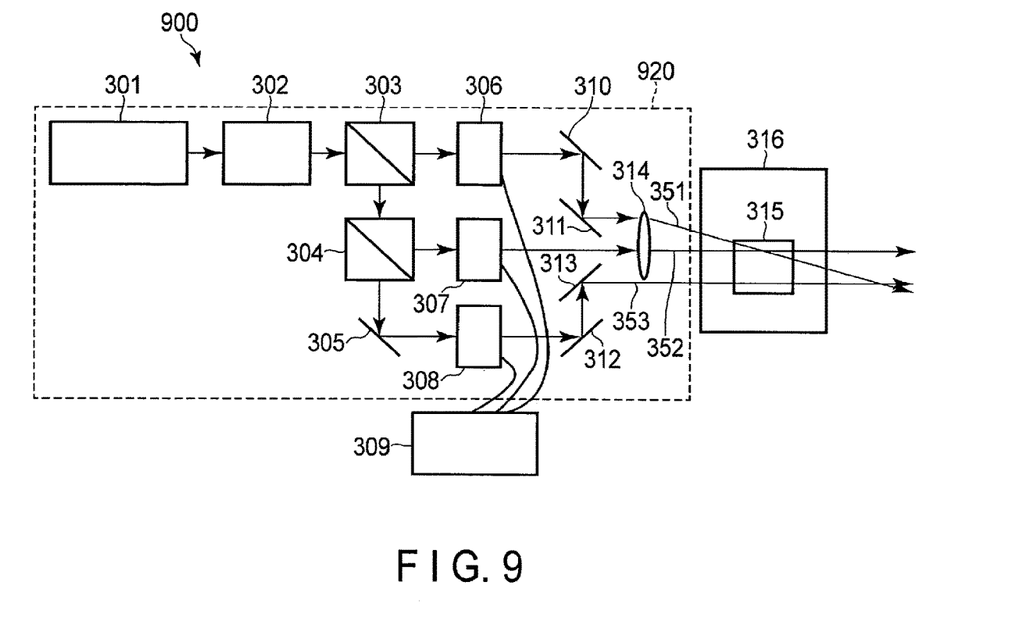
FIG. 9 illustrates a quantum computer according to still another embodiment.

FIG. 9 schematically illustrates a quantum computer 900 according to the third embodiment. The quantum computer 900 shown in FIG. 9 is similar in configuration to the quantum computer 300 of the first embodiment shown in FIG. 3. In the following, a description will be given mainly of the features distinguishing the third embodiment from the first embodiment.

In the third embodiment, ions $X_1$, $X_2$ and $X_3$ used as qubits and ions $Y_1$, $Y_2$ and Y3 used for the control of the resonance condition are located in different space regions. For example, the ions $X_1$, $X_2$ and $X_3$ are selected from the $Pr^{3+}$ ions in the upper portion of a sample 315, and the ions $Y_1$, $Y_2$ and $Y_3$ are selected from the $Pr^{3+}$ ions in the lower portion of the sample 315. In this case, as shown in FIG. 9, the light source unit 920 applies the modulated laser beams 351 and 352 to the upper portion of the sample 315, and applies the modulated laser beam 353 to the lower portion of the sample 315.

Like the first embodiment, the third embodiment enables efficient performance of a quantum gate.

Fourth Embodiment

In connection with the fourth embodiment, a description will be given of an example of a method for selecting $Pr^{3+}$ ions used as qubits from the $Pr^{3+}$ ions coupling with the common cavity mode. The quantum computer of the fourth embodiment is similar in configuration to the quantum computer 300 (FIG. 3) of the first embodiment and performs the quantum gate in the same method as the first embodiment. Accordingly, a repetitive description will be omitted.

M $Pr^{3+}$ ions included in a sample 315 and including transitions coupling with the common cavity mode will be referred to as ion 1, ion 2, . . . , ion M in the ascending order of the frequency of transition $|1\rangle-|e\rangle$. It is noted here that M is an integer which is not less than 2. The frequency difference between the $|1\rangle_1-|e\rangle_1$ transition and the $|1\rangle_2-|e\rangle_2$ transition will be expressed as $\Delta$, and the frequency difference between the $|1\rangle_1-|e\rangle_1$ transition and the $|1\rangle_j-|e\rangle_j$ transition (j: an integer not less than 3 and not more than M) will be expressed as $\Delta_j$. In this case, such ions as satisfy $\Omega_0<\Delta<N_2g/N$ and $\Omega_0<\Delta_j<N_2g/N$ are used as qubits. A predetermined number of ions used for the control of the resonance condition are selected in the descending order of the frequency difference $\Delta_j$.

The number $N_2$ of physical systems ($Pr^{3+}$ ions in this example) used for the control of the resonance condition may be any number not less than 1, but is preferably a value that is at least equal to the square of the number of qubits. This is because the eigenvalues of $H_1$ are practically dependent on the square root of $N_2$, as shown in Expression (10). For example, where three qubits are used, nine $Pr^{3+}$ ions including transitions coupling with the common cavity mode are used as physical systems for the control of the resonance condition. The nine $Pr^{3+}$ ions (referred to as ions $Y_1$ to $Y_9$) are selected from among the ions 1 to M in the descending order of frequency difference $\Delta_i$ as in the method described above. In this case, manipulations similar to those performed for the ions $Y_1$, $Y_2$ and $Y_3$ in the first embodiment are performed for the ions $Y_1$ to $Y_9$. To be specific, the sample 315 is irradiated with a laser beam that is modulated in such a manner as to enable the population to be collected in state $|2\rangle$ with respect to the ions $Y_1$ to $Y_9$.

Like the first embodiment, the fourth embodiment enables efficient performance of a quantum gate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum computer comprising:
physical systems $X_i$ (i=1, 2, . . . , N; N being an integer not less than 2) provided in a cavity, each of the physical systems $X_i$ comprising at least four states including states $|0\rangle_i$, $|1\rangle_i$, $|2\rangle_i$ and $|e\rangle_i$, energy of the state $|e\rangle_i$ being higher than energy of the states $|0\rangle_i$ and $|1\rangle i$ used for a qubit and energy of the state $|2\rangle_i$ used for assisting a gate operation, a $|2\rangle_i-|e\rangle_i$ transition being resonant with a cavity mode of the cavity;
a physical system $Y_j$ (j=1, 2, . . . , $N_2$; $N_2$ being an integer not less than 1) provided in the cavity, the physical system $Y_j$ being different from the physical systems $X_i$, the physical system $Y_j$ comprising at least two energy states including states $|2\rangle'_j$ and $|e\rangle'_j$, energy of the state $|e>'_j$ being higher than energy of the state $|2>'_j$, a $|2>'_j$-$|e>'_j$ transition being resonant with the cavity mode; and a light source unit which applies laser beams to the cavity to manipulate a state of a physical system $X_s$ (where s is a natural number not more than N) and a state of physical system $X_t$ (where t is a natural number not more than N and different from s) of the physical systems $X_i$, the laser beams including a first laser beam resonating with a $|1>_s$-$|e>_s$ transition, a second laser beam resonating with a $|1>_t$-$|e>_t$ transition, and a third laser beam for collecting population in the state $|2>'_j$ in the $|2>'_j$-$|e>'_j$ transition of the physical system $Y_j$.

2. The quantum computer according to claim 1, wherein the light source unit comprises:
a light source which emits a laser beam;
two beam splitters which divide the laser beam into a first branch laser beam, a second branch laser beam and a third branch laser beam;
a first optical modulator which modulates the first branch laser beam to generate the first laser beam;
a second optical modulator which modulates the second branch laser beam to generate the second laser beam; and
a third optical modulator which modulates the third branch laser beam to generate the third laser beam.

3. The quantum computer according to claim 1, wherein the light source unit comprises:
a first light source;
a first optical modulator which modulates a laser beam emitted from the first light source to generate the first laser beam;
a second light source;
a second optical modulator which modulates a laser beam emitted from the second light source to generate the second laser beam;
a third light source; and
a third optical modulator which modulates a laser beam emitted from the third light source to generate the third laser beam.

4. The quantum computer according to claim 1, wherein the cavity comprises a first space region including the physical systems $X_i$, and a second space region including the physical system $Y_j$, the second space region being different from the first space region, and the light source unit applies the third laser beam to the second space region.

5. A quantum computing method comprising:
preparing physical systems $X_i$ (i=1, 2, ..., N; N being an integer not less than 2) provided in a cavity, each of the physical systems $X_i$ comprising at least four states including states $|0>_i$, $|1>_i$, $|2>_i$ and $|e>_i$, energy of the state $|e>_i$ is higher than energy of the states $|0>_i$ and $|1>i$ used for a qubit and energy of the state $|2>_i$ used for assisting a gate operation, a $|2>_i$-$|e>_i$ transition being resonant with a cavity mode of the cavity;
preparing a physical system $Y_j$ (j=1, 2, ..., $N_2$; $N_2$ being an integer not less than 1) provided in the cavity, the physical system $Y_j$ being different from the physical systems $X_i$, physical system $Y_j$ comprising at least two energy states including $|2>'_j$ and $|e>'_j$, energy of the state $|e>'_j$ being higher than energy of the state $|2>'_j$, a $|2>'_j$-$|e>'_j$ transition being resonant with the cavity mode; and
applying laser beams to the cavity to manipulate state of a physical system $X_s$ (where s is a natural number not more than N) and a state of physical system $X_t$ (where t is a natural number not more than N and different from s) of the physical systems $X_i$, the laser beams including a first laser beam resonating with a $|1>_s$-$|e>_s$ transition, a second laser beam resonating with a $|1>_t$-$|e>_t$ transition, and a third laser beam for collecting population in the state $|2>'_j$ in the $|2>'_j$-$|e>'_j$ transition of the physical system $Y_j$.

6. The quantum computing method according to claim 5, further comprising:
applying the first laser beam and the second laser beam to the cavity, after applying the third laser beam to collect population in the state $|2>'_j$ of the physical system $Y_j$.

7. The quantum computing method according to claim 5, wherein if the physical systems $X_i$ comprises physical systems $X_1, X_2, ..., X_N$ in ascending order of frequency of a $|1>_i$-$|e>_i$ transition, a frequency difference between a $|1>_i$-$|e>_1$ transition and a $|1>_2$-$|e>_2$ transition is $\Delta$, and a frequency difference between a $|1>_1$-$|e>_1$ transition and a $|1>_k$-$|e>_k$ transition is $\Delta_k$, then the plurality of physical systems $X_i$ satisfy:
$\Omega_0 < \Delta < N_2 g/N$ and $\Omega_0 < \Delta_k < N_2 g/N$,
where g is a coupling constant between the cavity mode and each of the physical systems $X_i$, and $\Omega_0$ is a parameter for determining a maximum value of Rabi frequencies of the first laser beam and the second laser beam.

8. The quantum computing method according to claim 5, wherein $N_2 \geq N^2$ is satisfied.

* * * * *